United States Patent
Sundberg et al.

(10) Patent No.: US 10,320,527 B2
(45) Date of Patent: Jun. 11, 2019

(54) METHODS AND ARRANGEMENTS RELATING TO TRANSMISSION OF ADDITIONAL INFORMATION FROM A TRANSMITTING DEVICE TO A RECEIVING DEVICE IN A WIRELESS COMMUNICATIONS NETWORK

(71) Applicant: Telefonaktiebolaget LM Ericsson (publ), Stockholm (SE)

(72) Inventors: Mårten Sundberg, Årsta (SE); Gustav Almquist, Järfälla (SE); Stefan Eriksson Löwenmark, Färentuna (SE); Olof Liberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/108,978

(22) PCT Filed: Jun. 3, 2016

(86) PCT No.: PCT/SE2016/050535
§ 371 (c)(1),
(2) Date: Jun. 29, 2016

(87) PCT Pub. No.: WO2016/200316
PCT Pub. Date: Dec. 15, 2016

(65) Prior Publication Data
US 2017/0149534 A1    May 25, 2017

Related U.S. Application Data

(60) Provisional application No. 62/172,824, filed on Jun. 9, 2015.

(51) Int. Cl.
*H04L 1/00* (2006.01)
*H04L 1/08* (2006.01)

(52) U.S. Cl.
CPC .............. *H04L 1/08* (2013.01); *H04L 1/0033* (2013.01); *H04L 1/0036* (2013.01);
(Continued)

(58) Field of Classification Search
CPC . H04B 7/06; H04B 7/0613; H04J 1/00; H04L 1/00; H04L 1/08; H04L 1/0033;
(Continued)

(56) References Cited

U.S. PATENT DOCUMENTS

| 9,444,650 B2 * | 9/2016 | Muharemovic ....... H04L 5/0007 |
| 2002/0104054 A1 * | 8/2002 | Shin .................. H03M 13/2746 714/755 |

(Continued)

FOREIGN PATENT DOCUMENTS

| EP | 1 458 128 A1 | 9/2004 |
| WO | 2008/036977 A2 | 3/2008 |

OTHER PUBLICATIONS

International Search Report and Written Opinion issued in International application No. PCT/SE2016/050535 dated Jul. 26, 2016, 13 pages.

(Continued)

*Primary Examiner* — Shawkat M Ali
(74) *Attorney, Agent, or Firm* — Rothwell, Figg, Ernst & Manbeck, p.c.

(57) ABSTRACT

A transmitting device (12) and a receiving device (10) in a wireless communications network (1). The transmitting device (12) determines (701) additional information to transmit to the receiving device (10). The transmitting device (12) determined (702) an order of different circular shifts of repeated blocks of data as a set of transmission parameters indicating the additional information, each circular shift shifting bits differently. The transmitting device (12) then transmits (703) information to the receiving device (10), (Continued)

which receives the information, using the determined set of transmission parameters, thereby indicating the additional information to the receiving device (10).

29 Claims, 9 Drawing Sheets

(52) U.S. Cl.
CPC .......... *H04L 1/0046* (2013.01); *H04L 1/0071* (2013.01); *H04L 1/0072* (2013.01)

(58) Field of Classification Search
CPC ... H04L 1/0036; H04L 1/0046; H04L 1/0071; H04L 5/00; H04L 5/0048; H04L 7/04; H04L 27/00; H04L 27/26; H04L 27/28
USPC .............. 370/329, 330, 336, 343, 344, 445; 375/219, 260, 267, 285, 295, 296, 362; 455/403; 714/749
See application file for complete search history.

(56) References Cited

U.S. PATENT DOCUMENTS

| | | | | |
|---|---|---|---|---|
| 2004/0008760 A1* | 1/2004 | Dogan | ................ | H04L 25/0226 375/219 |
| 2004/0179586 A1* | 9/2004 | Vasudevan | ............ | H04L 1/0001 375/219 |
| 2007/0260958 A1* | 11/2007 | Li | .......................... | H04L 1/0048 714/755 |
| 2008/0310547 A1* | 12/2008 | Tiirola | ................ | H04L 27/2615 375/296 |
| 2015/0236884 A1* | 8/2015 | Suh | ..................... | H04L 27/2627 375/295 |
| 2016/0094325 A1* | 3/2016 | Liu | .......................... | H04L 23/02 370/329 |
| 2016/0204915 A1* | 7/2016 | Chen | ..................... | H04L 1/0061 370/329 |

OTHER PUBLICATIONS

3GPP TR 45.820 V1.0.1, "3rd Generation Partnership Project; Technical Specification Group GSM/EDGE Radio Access Network; Cellular System Support for Ultra Low Complexity and Low Throughput Internet of Things; (Release 13)," Mar. 2015, 147 pages.

* cited by examiner

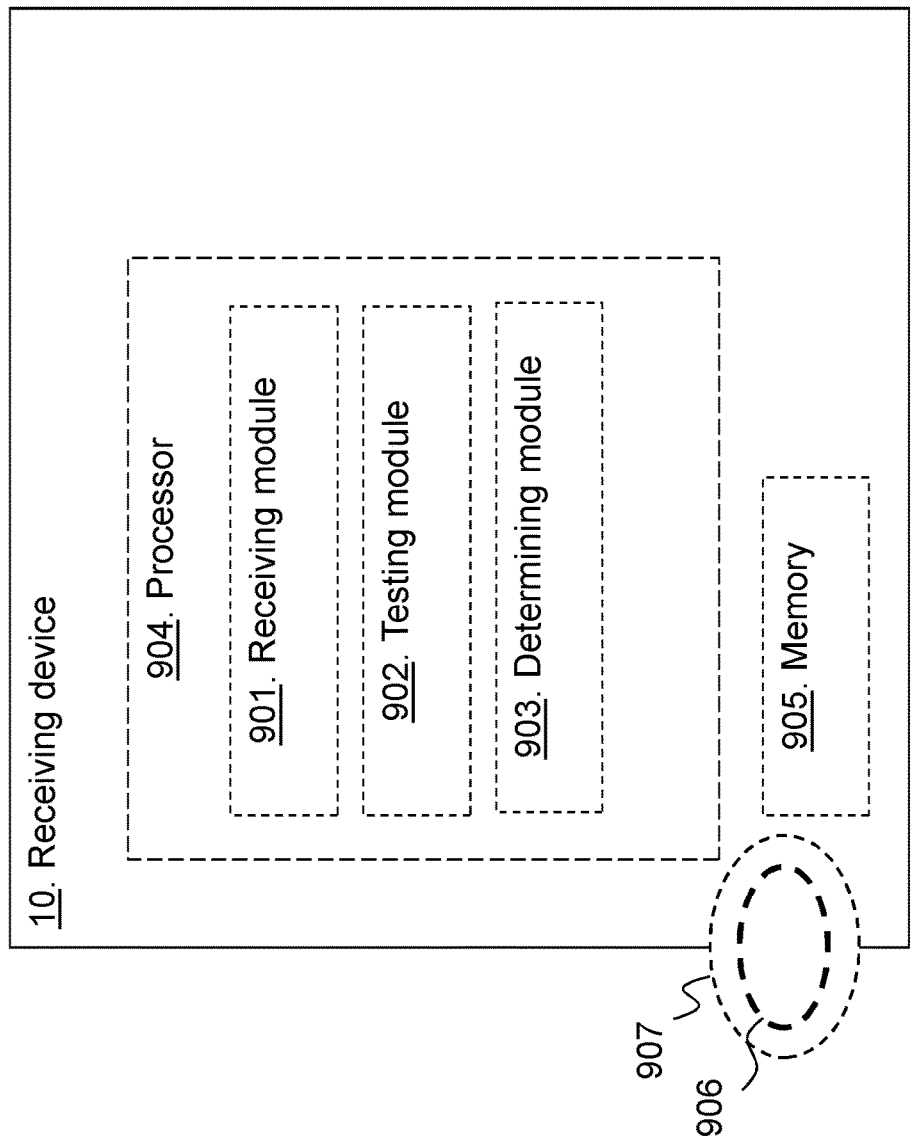

METHODS AND ARRANGEMENTS RELATING TO TRANSMISSION OF ADDITIONAL INFORMATION FROM A TRANSMITTING DEVICE TO A RECEIVING DEVICE IN A WIRELESS COMMUNICATIONS NETWORK

CROSS REFERENCE TO RELATED APPLICATION(S)

This application is a 35 U.S.C. § 371 National Phase Entry Application from PCT/SE2016/050535, filed Jun. 3, 2016, which claims priority to U.S. Application No. 62/172,824, filed Jun. 9, 2015. The above identified applications are incorporated by reference.

TECHNICAL FIELD

Embodiments herein relate to a transmitting device and a receiving device in a wireless communications network, and methods performed therein. In particular, embodiments herein relate to communicating additional information to a receiving device.

BACKGROUND

In a typical wireless communication network, communication terminals, also known as wireless devices and/or user equipments (UEs), communicate via a Radio Access Network (RAN) to one or more core networks. The RAN covers a geographical area which is divided into cell areas, with each cell area being served by a radio access node such as a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcasted in the cell. One radio access node may have one or more cells. The radio access nodes communicate over the air interface operating on radio frequencies with the communication terminals within range of the radio access nodes with downlink transmissions towards the communication terminals and uplink transmission from the communication terminals.

A Universal Mobile Telecommunications System (UMTS) is a third generation wireless communication system, which evolved from the second generation (2G) Global System for Mobile Communications (GSM). The UMTS terrestrial radio access network (UTRAN) is essentially a RAN using wideband code division multiple access ('A/CDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several radio access nodes may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio access nodes are directly connected to the EPC core network rather than to RNCs. In general, in E-UTRAN/LTE the functions of a RNC are distributed between the radio access nodes, e.g. eNodeBs in LTE, and the core network. As such, the Radio Access Network (RAN) of an EPS has an essentially "flat" architecture comprising radio access nodes without reporting to RNCs.

When catering for communication terminals in extended coverage, one common measure to take is to blindly, i.e. not wait for acknowledgement from a receiving device, repeat the information transmitted. If the procedure on how the repetitions have been performed is known to the receiving device, it can make use of that knowledge to maximize processing gain, and improve probability of decoding the transmitted information.

With repeated transmissions, more radio resources are consumed and hence it is of interest to maximize the information transfer as much as possible to the receiving end.

One efficient way of receiver processing is to coherently accumulate the blindly repeated information, and by this maximizing the processing gain, provided some conditions are fulfilled. One of these conditions is that the radio channel is close to stationary during the repetition interval. If this is not the case, the coherency is fully, or partially lost.

Another way of receiver processing is to combine "soft bits" of different blindly repeated transmissions. The receiving process typically involves demodulating the data, and from the demodulating process a set of "soft bits" is received. A soft bit could be seen as an estimation from the demodulator on how certain it is that the received bit is a 0 or a 1. The higher soft bit value, the higher the certainty. Combination of soft bits does not require that the channel is stationary, or that the repeated transmissions are identical, e.g. a reordering of the transmitted bits is allowed. On the other hand, a higher signal-to-noise ratio is required for soft combining to be effective.

One possible way of receiver processing is therefore to apply coherent combining over subsets of consecutive repeated blocks, and further to apply soft combining between these subsets.

If coherency over repetitions is not achievable due to some reason, for example the radio propagation channel not being stationary, as pointed out above, just retransmitting the same information blindly is not the most efficient way of transmitting information.

Explicit signaling of information in a repeated transmission scheme is costly as the same information is sent multiple times resulting in a reduced performance of the wireless communication network.

SUMMARY

An object of embodiments herein is to provide a mechanism that improves the performance of the wireless communications network.

According to a first aspect of embodiments herein, the object is achieved by a method, performed in a transmitting device, for transmitting additional information to a receiving device in a wireless communications network. The transmitting device determines additional information to transmit to the receiving device. The transmitting device determines an order of different circular shifts of repeated blocks of data as a set of transmission parameters indicating the additional information, each circular shift shifting bits differently. The transmitting device transmits information to the receiving device using the determined set of transmission parameters, thereby indicating the additional information to the receiving device.

According to a second aspect of embodiments herein, the object is achieved by a computer program comprising instructions that when executed by at least one processor cause the at least one processor to carry out the method according to the first aspect.

According to a third aspect of embodiments herein, the object is achieved by a computer-readable storage medium comprising the computer program according to the second aspect.

According to a fourth aspect of embodiments herein, the object is achieved by a method, performed in a receiving device, for receiving additional information from a transmitting device in a wireless communications network. The receiving device receives information from the transmitting device, which information has been transmitted using a set of transmission parameters indicating the additional information. The set of transmission parameters corresponds to a determined order of different circular shifts of repeated blocks of data, each circular shift shifting bits differently.

According to a fifth aspect of embodiments herein, the object is achieved by a computer program comprising instructions that when executed by at least one processor cause the at least one processor to carry out the method according to the fourth aspect.

According to a sixth aspect of embodiments herein, the object is achieved by a computer-readable storage medium comprising the computer program according to the fifth aspect.

According to a seventh aspect of embodiments herein, the object is achieved by a transmitting device for transmitting additional information to a receiving device in a wireless communications network. The transmitting device is configured to determine additional information to transmit to the receiving device. The transmitting device is further configured to determine an order of different circular shifts of repeated blocks of data as a set of transmission parameters indicating the additional information, each circular shift shifting bits differently. Moreover, the transmitting device is configured to transmit information to the receiving device using the determined set of transmission parameters, thereby indicating the additional information to the receiving device.

According to an eight aspect of embodiments herein, the object is achieved by a receiving device for receiving additional information from a transmitting device in a wireless communications network. The receiving device is configured to receive information from the transmitting device, which information has been transmitted using a set of transmission parameters indicating the additional information. The set of transmission parameters corresponds to a determined order of different circular shifts of repeated blocks of data, each circular shift shifting bits differently.

Embodiments herein has an advantage to effectively improve spectral efficiency by carrying additional information while not consuming more radio resources and thus improve the performance of the wireless communications network.

BRIEF DESCRIPTION OF THE DRAWINGS

The various aspects of embodiments disclosed herein, including particular features and advantages thereof, will be readily understood from the following detailed description and the accompanying schematic drawings, which are briefly described in the following. In some of the figures, dotted lines illustrate features that are not present in all embodiments.

FIG. 9 is a functional block diagram for illustrating embodiments of the receiving device.

DETAILED DESCRIPTION

Figure 1:
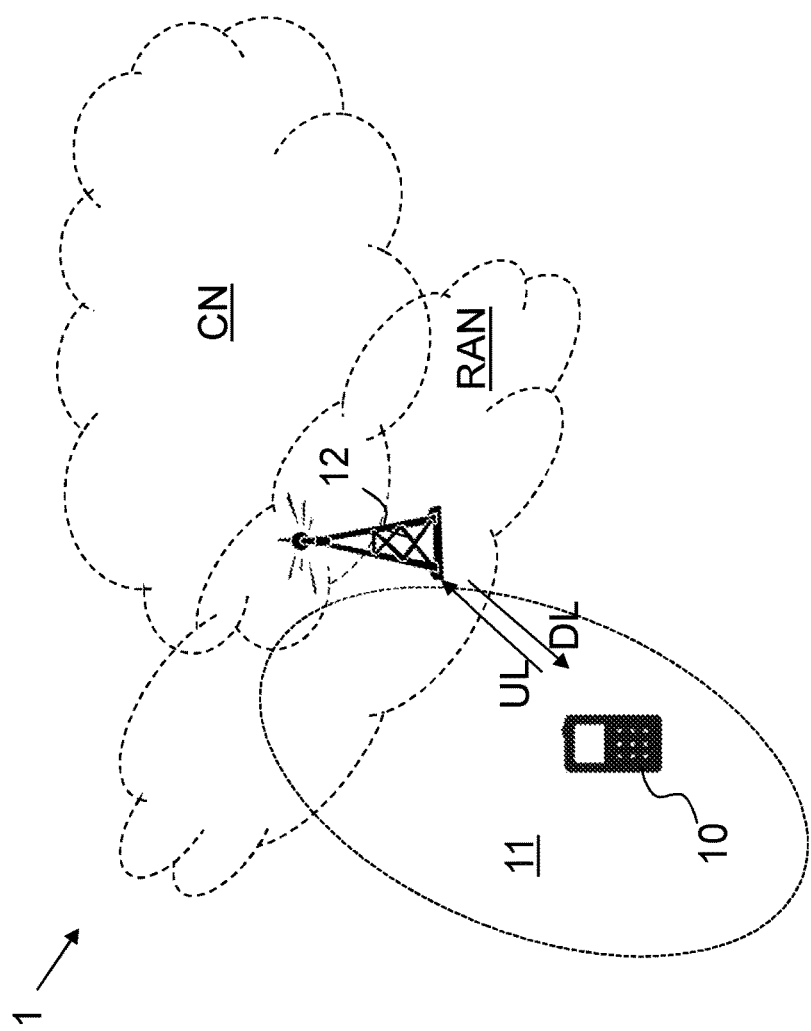
FIG. 1 is a block diagram schematically depicting an example of a wireless communication network.

Embodiments herein relate to wireless communication networks in general. FIG. 1 is a schematic overview depicting a wireless communication network 1 as an example of a wireless communication network relevant for embodiments herein. The wireless communication network 1 may comprise one or more RANs and one or more CNs. The wireless communication network 1 may be based on Global System for Mobile communications/Enhanced Data rate for GSM Evolution (GSM/EDGE) but may use a number of different technologies, such as Long Term Evolution (LTE), LTE-Advanced, Wideband Code Division Multiple Access (WCDMA), GSM/EDGE, Worldwide Interoperability for Microwave Access (WiMax), or Ultra Mobile Broadband (UMB), just to mention a few possible implementations.

In the wireless communication network 1, a receiving device 10, such as a communication terminal also known as a wireless device, a user equipment and/or a wireless terminal, typically communicate via a Radio Access Network (RAN) to one or more core networks (CN). It should be understood by the skilled in the art that "communication terminal" is a non-limiting term which means any wireless terminal, user equipment, Machine Type Communication (MTC) device, a Device to Device (D2D) terminal, or node e.g. smartphone, laptop, mobile, sensor, relay, mobile tablets or even a small base station communicating within respective cell.

The wireless communication network 1 may cover a geographical area which is divided into cell areas, e.g. a first cell 11. The first cell 11 being served by a transmitting device 12. The transmitting device 12 may be a radio access node such as a radio base station, a NodeBs, an evolved NodeB (eNB, eNode B), a base transceiver station, an Access Point Base Station, a base station router, or any other network unit capable of communicating with a receiving device within the cell served by the radio access node depending e.g. on the radio access technology and terminology used. The radio access nodes may serve one or more cells. A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but use different frequency bands.

The transmitting device 12 typically communicates over the air or radio interface operating on radio frequencies with the receiving device 10 within range of the transmitting device 12. The transmitting device 12 may transmit data over an air or radio interface to the receiving device 10 in Downlink (DL) transmissions. It should be noted that the transmitting device 10 may be a communication terminal transmitting data over the radio interface to a radio access node in Uplink (UL) transmissions, the radio access node then being the receiving device 10.

Embodiments herein may use implicit signaling for carrying additional information bits or additional information and may be introduced over a period of blind repetitions of information. In contrast to explicit signaling, an implicit scheme does not require transmission of actual data bits and can as such minimize the overhead associated with e.g. repeated transmissions, resulting in an improved performance of the wireless communication network. The transmitting device 12 may determine additional information to transmit to the receiving device 10. The transmitting device may further determine a set of transmission parameters indicating the determined additional information at the receiving device, e.g. the transmitting device 12 may further determine a set of transmission parameters out of a number of sets of transmission parameters, and each set of transmission parameters may be associated with an additional information bit or bits. The transmitting device 12 transmits information or data bits using the determined set of transmission parameters and thereby indicates the determined additional information to the receiving device 10.

The implicit signaling proposed herein to illustrate the principle of the proposed concept comprises using e.g. a set of different interleavers, being an example of a set of transmission parameters, during different 'interleaver intervals' over a full 'transmission interval'. The interleaver interval comprises a sub-set of the transmissions over the whole 'transmission interval'. Different circular shifts are preferably used as the different interleavers, i.e. the interleavers preferably are or correspond to different circular shifts, where the circular shifts differ by shifting bits differently. Circular shifts as the interleavers will be exemplified in some detail further below.

Assume for example a set of 4 unique interleavers and 8 copies, or blocks, of a message to be transmitted. A first interleaver is applied to block 1 and block 2, a second one to block 3 and block 4, a third one to block 5 and block 6 and a fourth one to block 7 and block 8. In the following a combination of two consecutive blocks is the interleaver interval. Interleaver interval 1 will hence refer to the combination of block 1 and 2.

If the receiving device 10 can identify which specific interleaver has been used in each respective interleaver interval, additional information bits can be conveyed. As different sets of transmission parameters, such as interleavers used over interleaving intervals, are mapped to a certain additional information bit/bits, see Table 1 below, and the mapping is known at the receiving device 10, the receiving device 10 may obtain additional information from the hypothesis when quality metric of decoded bits is satisfactory/fulfilled.

Note that conveying additional information bits by use of different interleavers is not limited to the case of repetition based transmissions. The same technique can be applied to any type of transmission scheme, with or without repetitions.

An example using a set of 4 interleavers, e.g. 4 different circular shifts, to carry different additional information is provided in Table 1. Not all possible combinations have been exhausted, and should only be seen as an example to illustrate the envisioned concept.

TABLE 1

Information bits carried or indicated by interleavers over different interleaver intervals transmitted

| Bits | Interleavers used over the four interleaver intervals |
|---|---|
| 00 | 1, 2, 3, 4 |
| 01 | 1, 2, 4, 3 |
| 10 | 2, 4, 3, 1 |
| 11 | 2, 3, 4, 1 |

For someone skilled in the art, it becomes obvious that this concept is applicable for various technologies, e.g. for GSM, UMTS and LTE. The concept is also not unique to implicit signaling via a set of interleavers. It, and the above example, may be extended, or adapted, to use a set of transmission parameters e.g. a set of modulation types, a set of modulation parameters e.g. symbol rotations, or a set of encoders for communicating data to the receiving device 10.

Embodiments herein effectively improve spectral efficiency by carrying additional information while not consuming more radio resources. Furthermore, different additional information can be conveyed in different repetitions while still allowing for soft combining.

Advantageously, an implicit signaling scheme that carries additional information bits may be introduced over a period of blind repetitions of information. The implicit signaling may consist of using different interleavers, e.g. said different circular shifts, during different interleaver intervals over a full repetition interval. A block is within the context of embodiments herein referring to a copy, local copy of information/data message to be transferred.

Figure 2:
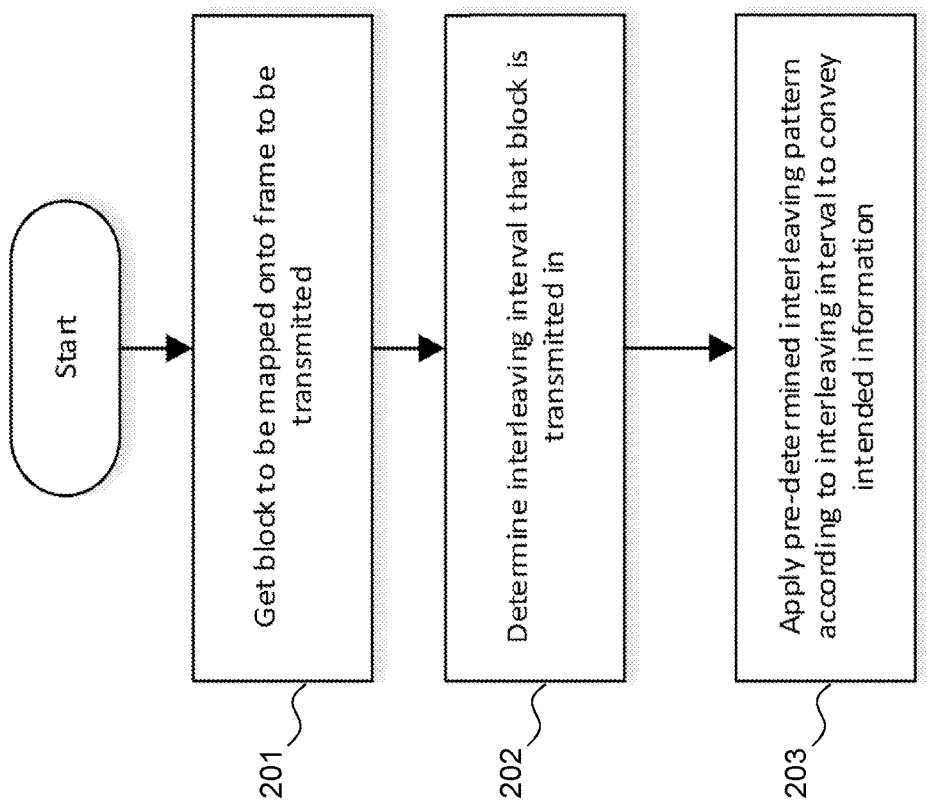
FIG. 2 is a flow chart schematically depicting a method relating to a generic implementation of embodiments herein.

A generic implementation of embodiments herein at the transmitting device 12 is shown in FIG. 2.

Action 201. The transmitting device 12 gets a first block or copy of data to be mapped onto a first frame to be transmitted.

Action 202. The transmitting device 12 determines interleaving interval that the first block is transmitted in.

Action 203. The transmitting device 12 applies a predetermined interleaving pattern, e.g. a pattern of different circular shifts, according to determined interleaving interval to convey intended additional information.

At the receiving device 10, typically a number of different attempts may be needed to find the correct de-interleaver pattern to be used over the different interleaver intervals in order to be able to correctly receive the additional data/information transmitted. A correct de-interleaver pattern may thus be a pattern given by the circular shifts that have been used as the interleavers. The information received is two-fold, i.e. with the correct de-interleaver, the additional data conveyed in the blindly repeated block can be decoded, and the de-interleaver pattern that enables the decoding will in itself convey further information, see for example Table 1. However, the receiving device 10 typically have to attempt different de-interleaver options before finding the correct pattern that enables reception of the additional data.

Figure 3:
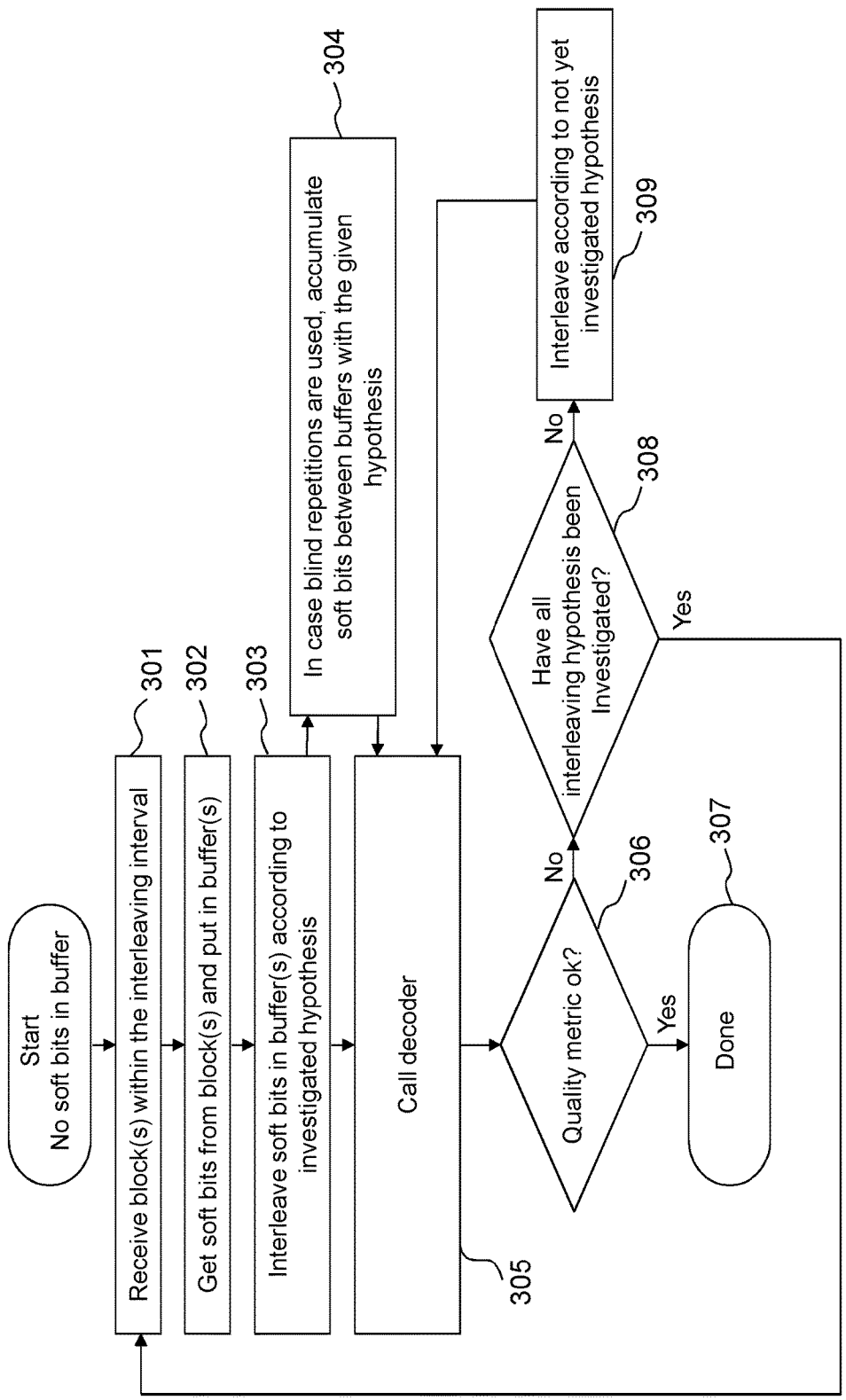
FIG. 3 is a flow chart schematically depicting a generic method relating to a behavior of a receiving device.

The receiving process typically involves coherent accumulation and subsequent demodulation of the data received per interleaving interval, and from the demodulating process reception of a set of "soft bits". A soft bit could be seen as an estimation from the demodulator on how certain it is that the received bit is a 0 or a 1. The higher soft bit value, the higher the certainty. Further, the receiving device 10 would typically buffer soft bits over multiple interleaving intervals to get enough information to convey the additional information implicitly signaled. In special cases the additional information can be conveyed already after the first interleaver interval. Consider again the example in Table 1 where the reception of interleaver pattern 1 or 2 in the first interleaving interval, will convey the first bit of information in the two-bit information conveyed. A behavior of the receiving device 10 is shown in FIG. 3.

The process is initiated with no soft bits in a buffer at the receiving device 10.

Action 301. The receiving device 10 may receive block(s) within an interleaving interval.

Action 302. The receiving device 10 may get soft bits from the block(s) and put in the buffer.

Action 303. The receiving device 10 may interleave soft bits in buffer(s) according to an investigated hypothesis, e.g. according to an investigated hypothesis about circular shift used for the interleaving interval.

Action 304. The receiving device 10 may then in the case blind repetitions are used, accumulate soft bits between buffers with the investigated (given) hypothesis. Thus, when blind repetitions are used the receiving device 10 can still use soft bit accumulation to increase the chance of decoding the block even if different hypothesis, e.g. about interleavers, are used.

Action 305. The receiving device 10 may use, or call, a decoder to decode the soft bits.

Action 306. The receiving device 10 may then check a quality metric of the decoded data.

Action 307. If the quality metric is fulfilled or satisfactory e.g. above a threshold or correct according to a Cyclic Redundancy Check (CRC), the receiving device 10 may determine the additional information and the process is done.

Action 308. If the quality metric is not fulfilled or satisfactory e.g. below a threshold or CRC incorrect, the receiving device 10 may determine whether all interleaving hypothesis have been investigated.

Action 309. If not all interleaving hypothesis have been investigated, the receiving device 10 may interleave according to a not yet investigated hypothesis. Then the data is decoded again. If all interleaving hypothesis have been investigated, the receiving device may go back to receive block(s) within an interleaving interval.

The hypothesis testing referred to in FIG. 3 is when the receiving device 10 attempts different de-interleaver patterns selected among a set of patterns it knows the transmitting device 12 is allowed to use, e.g. the transmitting device may be allowed and may be known to use only certain circular shifts. The quality metric referred to could be a cyclic redundancy check (CRC) of the block transmitted. If the receiving device 10 gets a "CRC OK" after decoding, the receiving device 10 can assume that the correct de-interleaver pattern has been applied.

The interleaver, or code word, used for a specific transmission may or may not be selected from a predefined set of interleavers, or a code book. The code words could be selected freely from the code book for each transmission which would yield the highest implicit signaling throughput. The code words could also be selected in some specific order from the code book which would include an amount of redundancy in the implicit signaling which would lower the throughput but increase the chance of successful decoding of the code words.

As already indicated, the interleaver applied is preferably a circular shift selected from a specific pre-defined order of simple pre-determined cyclic shifts of the block.

In GSM, repetitions may be applied for the, at least previously, so called Extended Coverage GSM (EC-GSM) feature, see e.g. 3GPP TR45.820, "Cellular system support for ultra-low complexity and low throughput internet of things", version 1.3.0, and embodiments herein would advantageously apply in this case. One of the channels that typically need to be designed for a worst case coverage scenario is the Extended Coverage Synchronization CHannel (EC-SCH). The EC-SCH is valuable in the sense that its content will be read by all mobiles, e.g. the receiving device 10, in a cell, e.g. the cell 11, before accessing the network, e.g. the wireless communications network 1. Hence powerful signaling information can be provided that are ensured to be read by all devices in the cell before every access attempt. As such, if any additional bits can be conveyed, it is of value.

One of the purposes with the EC-SCH is to provide the frame number to a communication terminal, e.g. the receiving device 10. However, a EC-SCH block is repeated over a certain number of 51-multiframes, and due to the blind repetitions, all repeated blocks are required to have the same content. Hence, what typically is required by the communication terminal, such as the receiving device 10, is to understand which 51-multiframe the EC-SCH block is received in, alternatively for a communication terminal that requires all repetitions to receive the EC-SCH block, it may need to determine where the repetition interval starts. Once this is determined, a full frame number can be acquired.

Figure 4:
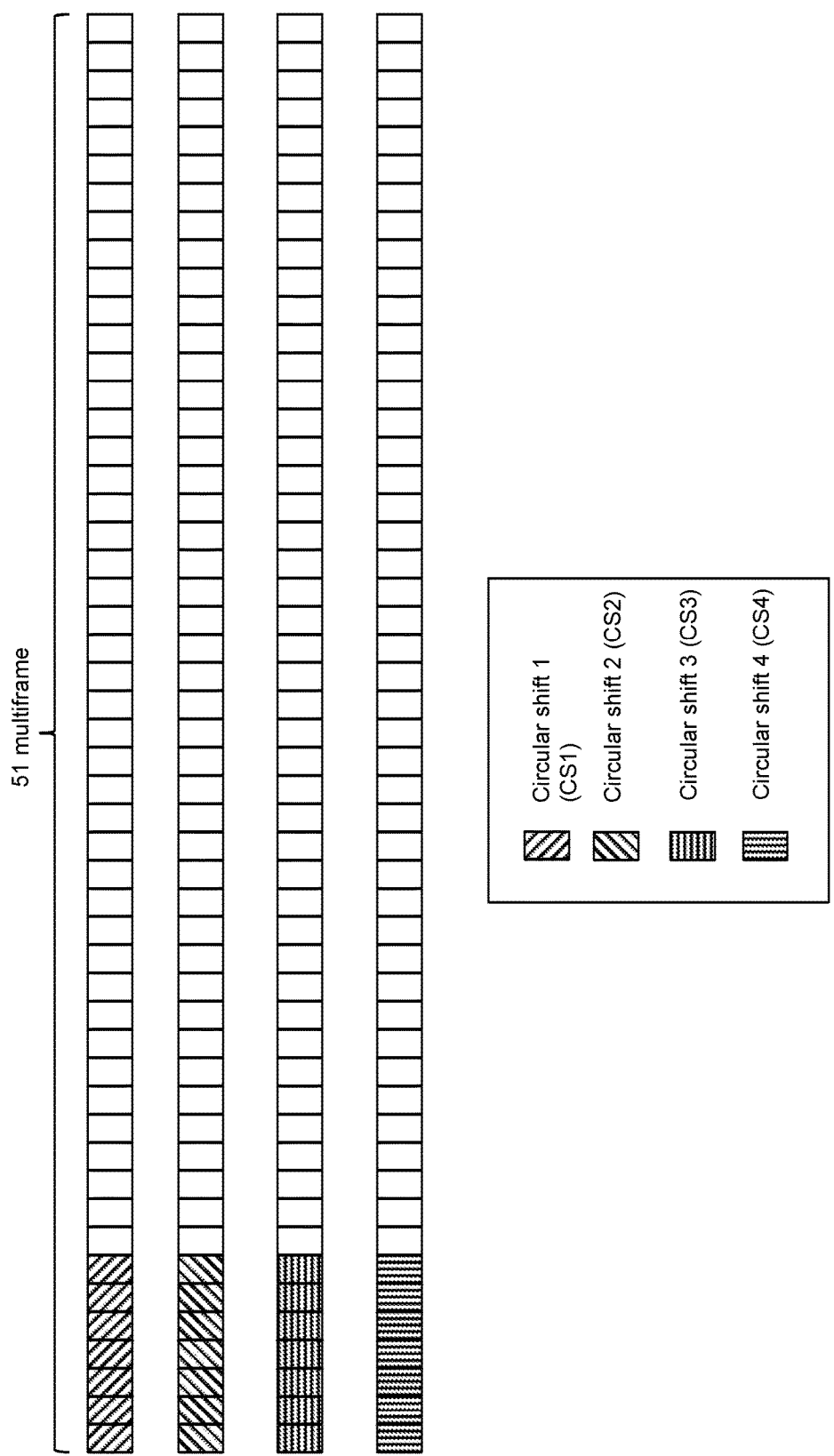
FIG. 4 schematically illustrates how embodiments herein can be applied to an EC-SCH logical channel.

In FIG. 4 it is schematically illustrated how embodiments herein can be applied to the EC-SCH logical channel where the block is repeated 7 times in the first TDMA frames of the 51-multiframe, and furthermore this is applied to four consecutive 51-multiframes. Hence the total number of identical transmissions is 28. FIG. 4 shows EC-SCH repetition over 4 51-multiframes using different circular shifts between multiframes.

In the figure it is shown an embodiment that utilizes circular shift of the bits of the block. A different circular shift is applied depending on which 51-multiframe within the overall repetition period of 4 51-multiframes the transmitting device 12 is transmitting in.

It should be noted that this is a specific implementation. The use of 4 51-multiframes, the use of circular shift as interleaver, and the number of repetitions within each 51 multiframe correspond to some embodiments herein.

Figure 5:
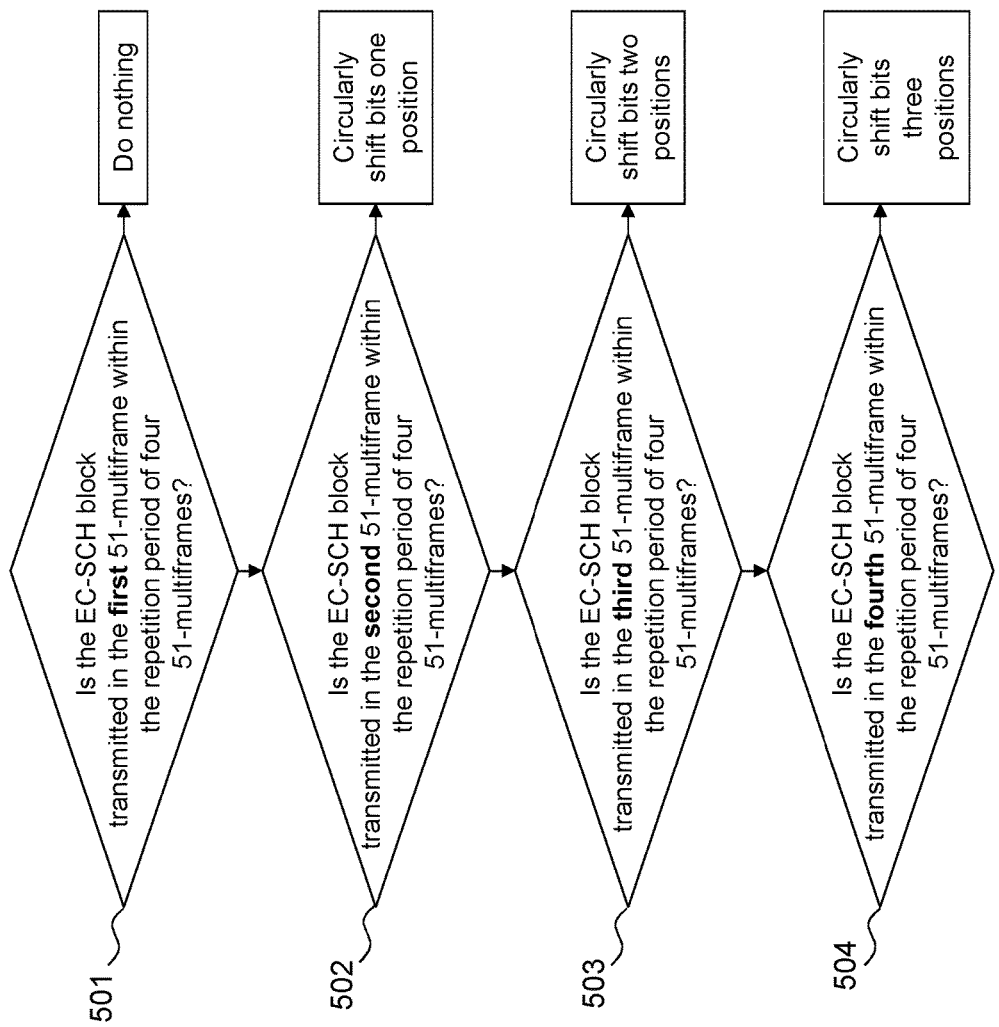
FIG. 5 is a flow chart schematically depicting how a transmitting device may behave based on embodiments herein.

An example of how the transmitting device 12 may behave based on embodiments herein is described in FIG. 5. FIG. 5 shows EC-SCH repetition over 4 51-multiframes using circular shift between multiframes.

Action 501. The transmitting device 12 determines whether the EC-SCH block is transmitted in the first multiframe within the repetition period of four 51-multiframes. That being the case, the transmitting device 12 does not do anything.

Action 502. That not being the case, the transmitting device 12 determines whether the EC-SCH block is transmitted in the second multiframe within the repetition period of four 51-multiframes. That being the case, the transmitting device 12 circularly shifts bits one position.

Action 503. That not being the case, the transmitting device 12 determines whether the EC-SCH block is transmitted in the third multiframe within the repetition period of four 51-multiframes. That being the case, the transmitting device 12 circularly shifts bits two positions.

Action 504. That not being the case, the transmitting device 12 determines whether the EC-SCH block is transmitted in the fourth multiframe within the repetition period of four 51-multiframes. That being the case, the transmitting device 12 circularly shifts bits three positions.

Figure 6:
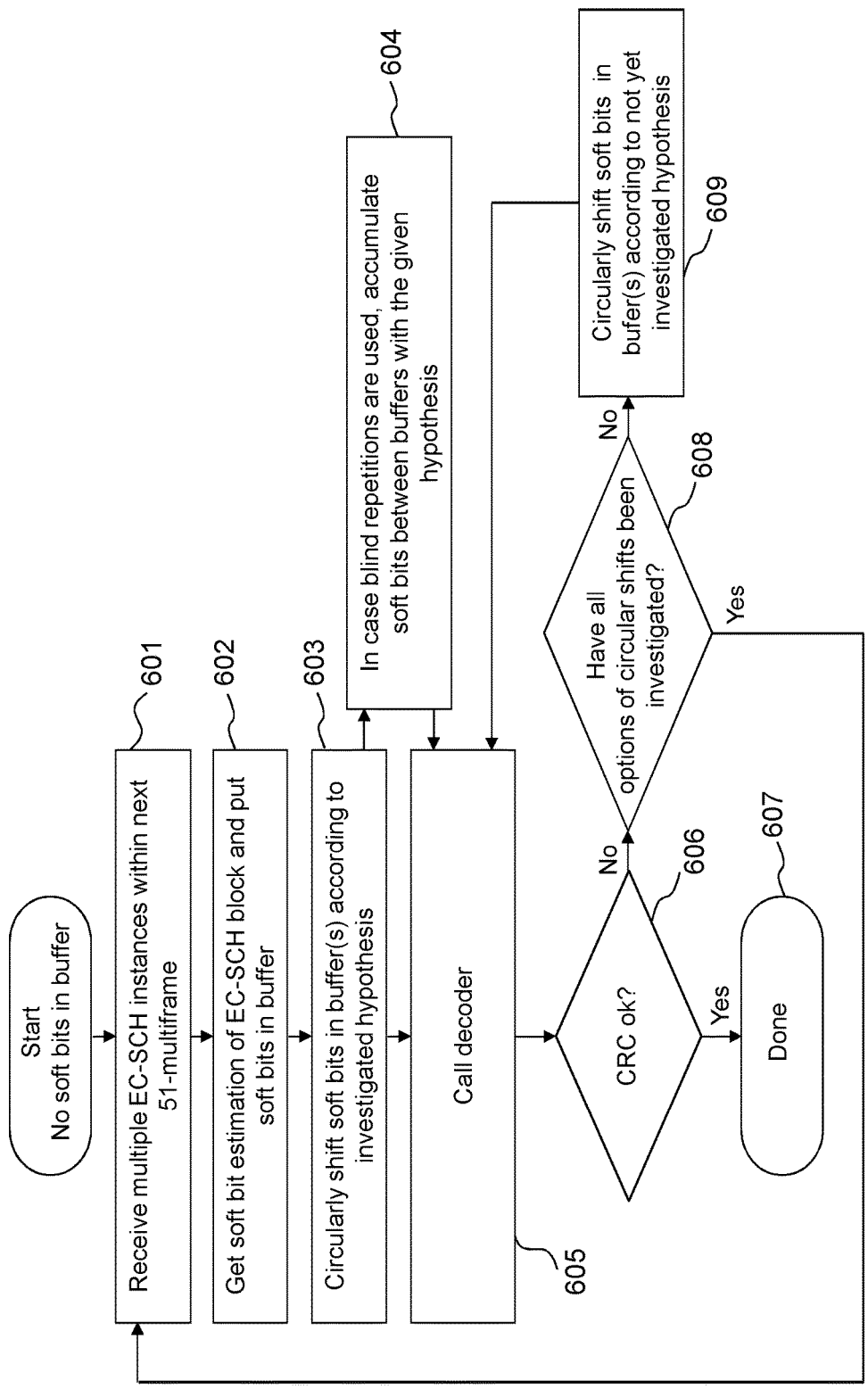
FIG. 6 is a flow chart schematically depicting a more detailed method relating to a behavior of the receiving device.

An example of how the receiving device 10 may behave based on embodiments herein is described in FIG. 6. FIG. 6 shows EC-SCH repetition over 4 51-multiframes using circular shift between multiframes.

The process is initiated with no soft bits in a buffer at the receiving device 10.

Action 601. The receiving device 10 may receive multiple EC-SCH instances within a next 51-multiframe.

Action 602. The receiving device 10 may get soft bit estimation of EC-SCH block and put soft bits in the buffer.

Action 603. The receiving device 10 may circularly shift soft bits in buffer(s) according to an investigated hypothesis.

Action 604. The receiving device 10 may then in the case blind repetitions are used, accumulate soft bits between buffers with the investigated, and typically given, hypothesis. Thus, when blind repetitions are used the receiving device 10 can still use soft bit accumulation to increase the chance of decoding the block even if different hypothesis, e.g. interleavers such as circular shifts, are used.

Action 605. The receiving device 10 may use, or call, a decoder to decode the soft bits.

Action 606. The receiving device 10 may then check a quality metric of the decoded data, e.g. check that a CRC is OK.

Action 607. If the CRC is OK, the receiving device 10 may determine the additional information and the process is done.

Action 608. If the CRC is not OK, the receiving device 10 may determine whether all options of circular shifts have been investigated.

Action 609. If not all circular shifts have been investigated, the receiving device 10 may circular shift soft bits in the buffer(s) according to a not yet investigated hypothesis. Then the data is decoded again. If all circular shifts have been investigated, the receiving device 10 may go back to receive multiple EC-SCH instances within a next 51-multiframe.

Figure 7:
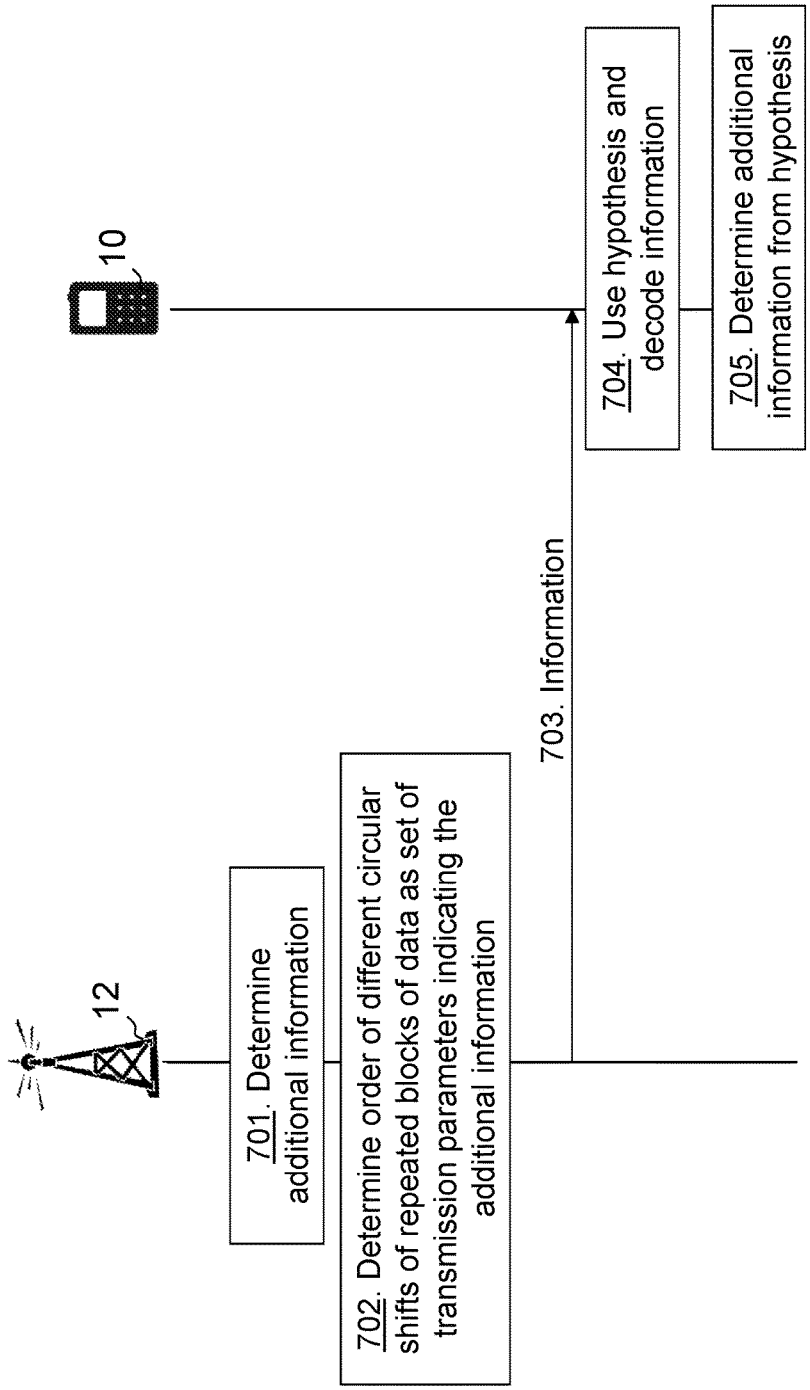
FIG. 7 is a combined signaling diagram and flowchart for describing embodiments herein.

FIG. 7 is a combined flowchart and signaling scheme for schematically illustrating method embodiments performed in a transmitting device, e.g. the transmitting device 12, and in a receiving device, e.g. the receiving device 10. The method performed in the transmitting device is for transmitting additional information to the receiving device 10 in a wireless communications network, e.g. the wireless communications network 1. The method performed in the receiving device 10 is for obtaining additional information from a transmitting device, e.g. the transmitting device 12, in a wireless communications network, e.g. the wireless communications network 1.

Said methods comprise the following actions that may be executed in any suitable order:

Action 701. The transmitting device 12 determines additional information to transmit to the receiving device 10. The transmitting device 12 may e.g. determine to send one or more information bits as said additional information to the receiving device 10. As should be realized, a meaning of 'one or more information bits as additional information', at least as used herein, is 'one or more bits set to values, thereby containing the additional information'. Without being set to a value, a bit or bits may hardly transmit any information and thus not be one or more information bits.

Action 702. The transmitting device 12 determines an order of different circular shifts of repeated blocks of data as a set of transmission parameters indicating the additional information, each circular shift shifting bits differently. The transmission parameters are for indicating the additional information. Alternatively and more generically described, the transmitting device 12 may further determine a set of transmission parameters, e.g. determine to use which different interleavers over different interleavers intervals over a full repetition interval, indicating the determined additional information at the receiving device 10.

The different circular shifts may thus be used during different intervals, respectively, when transmitting the information, each interval comprising a sub-set of transmissions over a longer, whole transmission interval for transmitting the information.

When said additional information is said one or more information bits, these may be mapped to a certain order of said different circular shifts, which certain order indicates said one or more information bits implicitly at the receiving device, and said determined order is then determined as said certain order.

Action 703. The transmitting device 12 transmits information to the receiving device 10 using the determined set of transmission parameters, thereby indicating the additional information to the receiving device 10. Alternatively described, the transmitting device 12 transmits information or data bits using the determined set of transmission parameters indicating the determined additional information to the receiving device 10. The receiving device 10 receives said information or data bits from the transmitting device 12. Or in other words, the receiving device 10 receives information from the transmitting device, which information has been transmitted using a set of transmission parameters indicating the additional information. The transmission parameters corresponding to a determined order of different circular shifts of repeated blocks of data, each circular shift shifting bits differently.

In a specific embodiment, the repeated blocks of data are repeated 7 times in the first TDMA frames of each of 4 consecutive 51-multiframes and a different circular shift is applied depending on which 51-multiframe is being transmitted. In this embodiment the the additional information thus consists of 2 bits that are transmitted using said determined order of 4 different circular shifts and the additional information is indicated by how said 4 different circular shifts map to said four consecutive 51-multiframes.

Action 704. The receiving device 10 may use a hypothesis regarding a used set of transmission parameters for transmitting the additional information and decoding the received information, the used set of transmission parameters being said order of different circular shifts of repeated blocks of data. In other words, the receiving device 10 may use a hypothesis regarding a used set of transmission parameters for transmitting additional information and may decode the received information.

Action 705. The receiving device 10 may then check a quality metric of the decoded information and when the quality metric is satisfactory, the receiving device 10 may determine the additional information from the hypothesis used. As mentioned above, said additional information may be one or more information bits mapped to said order, which order indicates the one or more information bits implicitly at the receiving device. As also mentioned above, the different circular shifts have been used during different intervals, respectively, when transmitting the information, each interval comprising a sub-set of transmissions over a longer, whole transmission interval for transmitting the information. Hence, in the case when the repeated blocks of data are repeated 7 times in the first TDMA frames of each of 4 consecutive 51-multiframes and a different circular shift is applied depending on which 51-multiframe is being transmitted, the additional information consists of 2 bits that are transmitted using said determined order of 4 different circular shifts. The additional information is then thus indicated by how said 4 different circular shifts map to said four consecutive 51-multiframes.

Figure 8:
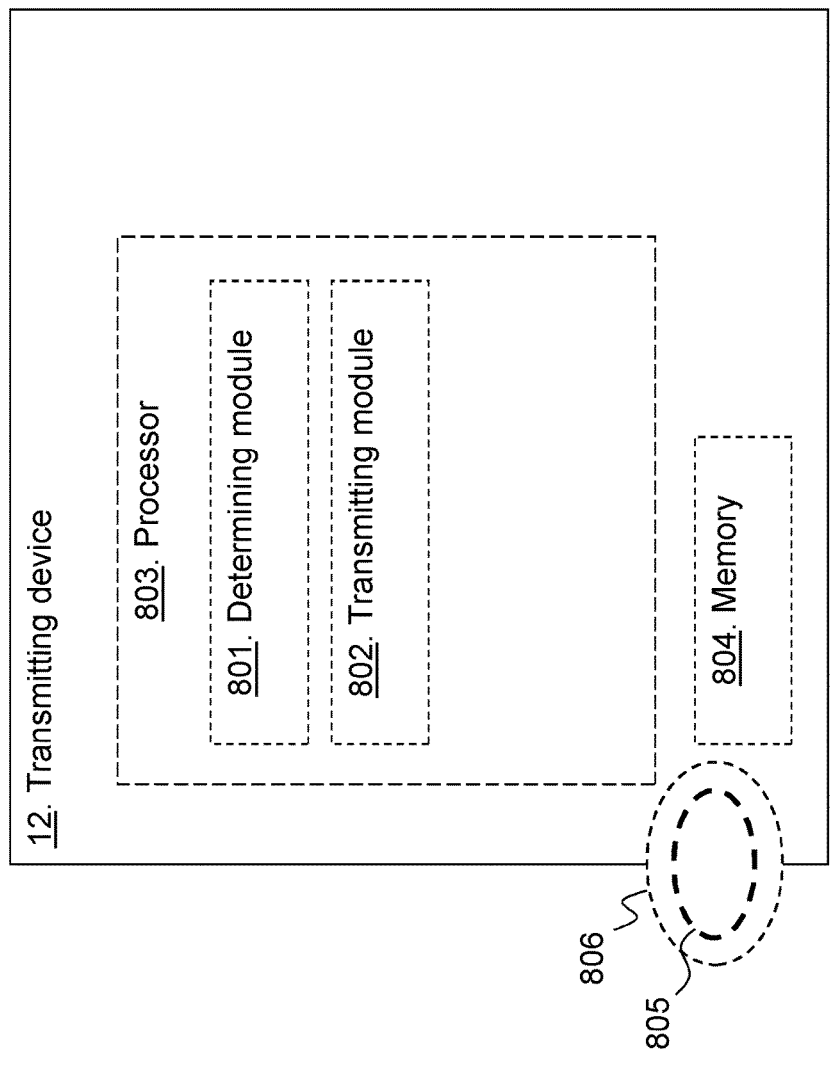
FIG. 8 is a functional block diagram for illustrating embodiments of the transmitting device.

In order to perform the method above, a transmitting device, e.g. the transmitting device 12, may be provided. FIG. 8 is a schematic block diagram for illustrating embodiments of the transmitting device 12, in particular how it may be configured to perform the method and/or one or more actions thereof as described above. The figure thus shows the transmitting device 12 for transmitting additional information to the receiving device 10 in the wireless communications network 1. The transmitting device 12 is configured to determine additional information to transmit to the receiving device 10. The transmitting device 12 is further configured to determine said order of different circular shifts of repeated blocks of data as the set of transmission parameters indicating the additional information. Alternatively and more generically described, the transmitting device 12 may be configured to determine or select a set of transmission parameters indicating the determined additional information at the receiving device 10. The transmitting device 12 may thus also be configured to determine to send one or more information bits as said additional information to the receiving device 10, said one or more information bits being mapped to a certain order of said different circular shifts, which certain order indicates said one or more information bits implicitly at the receiving device. The transmitting device 12 may be configured to determine said order as said certain order. The transmitting device 12 may e.g. comprise a determining module 801 configured to carry out said actions of determining, e.g. to determine said additional information to transmit to the receiving device 10 and to determined said order of different circular shifts of repeated blocks of data, or to determine or select said set of transmission parameters indicating the determined additional information at the receiving device 10. The set of transmission parameters may thus be mapped to one or more additional information bits and which mapping is known at the receiving device 10.

The transmitting device 12 is further configured to transmit information to the receiving device 10 using the determined set of transmission parameters, thereby indicating the additional information to the receiving device 10. Alternatively described, the transmitting device 12 may be further configured to transmit information or data bits using the determined set of transmission parameters indicating the determined additional information to the receiving device. The transmitting device 12 may comprise a transmitting module 802 configured to carry out said actions of transmitting, e.g. to transmit the information or data bits using the determined set of transmission parameters, thereby indicating the determined additional information to the receiving device 10, thus, implicitly signal additional information to the receiving device 10.

The embodiments herein for transmitting/communicating additional data and/or information may be implemented through one or more processors 803 that may be comprised in the transmitting device 12 depicted in FIG. 8, e.g. together with computer program code, which processor 803 or processing means is configured to perform the functions and/or method actions of the embodiments herein.

The transmitting device 12 may further comprise a memory 804. The memory may comprise one or more units to be used to store data on, e.g. set of transmission parameters, such as interleaver information, code words, interleaver intervals, circular shifts, applications to perform the methods disclosed herein when being executed, and similar.

The methods according to the embodiments described herein for the transmitting device 12 may be implemented by means of e.g. a computer program 805 or a computer program product, comprising instructions, i.e., software code portions, which, when executed on at least one processor, e.g. the one or more processors 803, cause the at least one processor to carry out the actions described herein, as performed by the transmitting device 12. The computer program 805 may be stored on a computer-readable storage medium 806, e.g. a disc or similar. The computer-readable storage medium 806 may thus comprise the computer program 805. The computer-readable storage medium 806, having stored thereon the computer program 805, may comprise the instructions which, when executed on at least one processor, cause the at least one processor to carry out the actions described herein, as performed by the transmitting device 12. In some embodiments, the computer-readable storage medium 806 may be a non-transitory computer-readable storage medium.

In order to perform the method above, a receiving device, e.g. the receiving device 10 may be provided. FIG. 9 is a schematic block diagram for illustrating embodiments of the transmitting device 12, in particular how it may be configured to perform the method and/or one or more actions thereof as described above. The figure shows the receiving device 10 for receiving additional information or additional data/information bits from a transmitting device, e.g. the transmitting device 12, in a wireless communications network, e.g. the wireless communications network 1.

The receiving device 10 is configured to receive said information from the transmitting device 12, which information has been transmitted using a set of transmission parameters indicating the additional information, and which set of transmission parameters correspond to a determined order of different circular shifts of repeated blocks of data, each circular shift shifting bits differently. Alternatively and more generically described, the receiving device 10 may be configured to receive information or data bits from the transmitting device 12.

The receiving device 10 may comprise a receiving module 901 configured to carry out said action of receiving, e.g. to receive information or data bits from the transmitting device 12.

Furthermore, the receiving device 10 may be configured to use, e.g. to test, said hypothesis regarding a used set of transmission parameters for transmitting additional information and to decode the received information. The used set of transmission parameters is thus typically said order of different circular shifts of repeated blocks of data. The receiving device may comprise a testing module 902, or using module, configured to test, or use, the hypothesis regarding a used set of transmission parameters for transmitting additional information and to decode the received information The receiving device 10 may further be configured to check said quality metric of the decoded information and the receiving device 10 may be configured to, when the quality metric is satisfactory, determine, and/or obtain, the additional information from the hypothesis used. The receiving device 10 may comprise an determining module 903, or determining and/or obtaining module, configured to carry out said action of determining and/or obtaining, e.g. to check the quality metric of the decoded information and when the quality metric is satisfactory, to determine/obtain the additional information from the hypothesis used.

The embodiments herein for handling communication, i.e. receiving information and/or additional information, with the transmitting device 12 may be implemented through one or more processors 904 in the receiving device 10 depicted in FIG. 9, e.g. together with computer program code, which processor 904 or processing means is configured to perform the functions and/or method actions of the embodiments herein.

The receiving device 10 further comprises a memory 905. The memory comprises one or more units to be used to store data on, such as interleaving information, mapping of additional information to certain interleaver applications, applications to perform the methods disclosed herein when being executed, and similar.

The methods according to the embodiments described herein for the receiving device 10 may be implemented by means of e.g. a computer program 906 or a computer program product, comprising instructions, i.e., software code portions, which, when executed on at least one processor, e.g. the one or more processors 903, cause the at least one processor to carry out the actions described herein, as performed by the receiving device 10. The computer program 906 may be stored on a computer-readable storage medium 907, e.g. a disc or similar. The computer-readable storage medium 907 may thus comprise the computer program 906. The computer-readable storage medium 907, having stored thereon the computer program 906, may comprise the instructions which, when executed on at least one processor, cause the at least one processor to carry out the actions described herein, as performed by the receiving device 10. In some embodiments, the computer-readable storage medium 907 may be a non-transitory computer-readable storage medium.

Based on the above, the following are generically described examples relating to embodiments herein:

A method may be performed in a transmitting device for transmitting additional information to a receiving device in a wireless communications network. The transmitting device determines additional information to transmit to the receiving device. The transmitting device further determines a set of transmission parameters indicating the determined additional information at the receiving device. The transmitting device transmits information or data bits using the determined set of transmission parameters indicating the determined additional information to the receiving device. For example, the transmitting device may determine to send a system information bit as additional information to the receiving device. This system information bit may be mapped to a certain order of interleavers of repeated blocks or copies of data, which certain order indicates the system information implicitly at the receiving device. The transmitting device then determines an order of interleavers, being an example of set of transmission parameters, and transmits data to the receiving device using the order and thereby indicates the additional information to the receiving device.

Further, a method may be performed by a receiving device for obtaining additional information from a transmitting device. The receiving device receives information or data bits from the transmitting device. The receiving device uses a hypothesis regarding a used set of transmission parameters for transmitting additional information and decodes the received information. The receiving device then checks a quality metric of the decoded information and when the quality metric is satisfactory the receiving device determines the additional information from the hypothesis used.

In order to perform the above methods, a transmitting device and a receiving device may be provided.

The transmitting device may thus be for transmitting additional information to a receiving device in a wireless communications network. The transmitting device is configured to determine additional information to transmit to the receiving device. The transmitting device is further configured to determine a set of transmission parameters indicating the determined additional information at the receiving device. The transmitting device is also configured to transmit information or data bits using the determined set of transmission parameters indicating the determined additional information to the receiving device.

The receiving device may this be for obtaining additional information from a transmitting device. The receiving device is configured to receive information or data bits from the transmitting device. The receiving device is further configured to use a hypothesis regarding a used set of transmission parameters for transmitting additional information, and to decode the received information. The receiving device is configured to check a quality metric of the decoded information and when the quality metric is satisfactory the receiving device is configured to determine the additional information from the hypothesis used.

As will be readily understood by those familiar with communications design, functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a transmitting device or receiving device, for example.

Alternatively, several of the functional elements of the processor or processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, performed in a transmitting device, for transmitting additional information to a receiving device in a wireless communications network, wherein the method comprises:
   determining additional information to transmit to the receiving device, the additional information comprising an ordered sequence of bits;
   based on the ordered sequence of bits, selecting an ordered sequence of transmission parameters comprising a plurality of transmission parameters arranged in a sequence of positions, the sequence of positions comprising an initial position, wherein a first transmission parameter of the plurality of transmission parameters is at the initial position in the ordered sequence of transmission parameters and a second transmission parameter of the plurality of transmission parameters is at a second position in the ordered sequence of transmission parameters, the ordered sequence of transmission parameters being selected to indicate the ordered sequence of bits to the receiving device;
   applying the first transmission parameter to a first block of data;
   applying the second transmission parameter to a second block of data; and
   transmitting information to the receiving device using the ordered sequence of transmission parameters, wherein the ordered sequence of transmission parameters indicates the additional information to the receiving device.

2. The method of claim 1, wherein the ordered sequence of bits is mapped to a certain order of transmission parameters, the certain order of transmission parameters being selected as the ordered sequence of transmission parameters.

3. The method of claim 1, wherein the ordered sequence of transmission parameters comprises an ordered sequence of different circular shifts.

4. The method of claim 1, wherein the transmitted information comprises blocks of data that are repeated 7 times in a first set of time division multiple access frames of each of 4 consecutive 51-multiframes and a different circular shift is selected based on the 51-multiframe that is being transmitted, whereby the additional information consists of 2 bits that are transmitted using a determined order of 4 different circular shifts, and the additional information being indicated by how said 4 different circular shifts map to said four consecutive 51-multiframes.

5. A computer program product comprising a non-transitory computer readable medium storing a computer program comprising instructions that when executed by at least one processor cause the at least one processor to carry out the method of claim 1.

6. The method of claim 1, further comprising:
   transmitting second information to the receiving device using a second ordered sequence of transmission parameters comprising a second plurality of transmission parameters arranged in a second sequence of positions, the second sequence of positions comprising an initial position, the second ordered sequence of transmission parameters indicating second additional information comprising a second ordered sequence of bits;
   wherein the second ordered sequence of transmission parameters comprises the first transmission parameter at a position in the second sequence of positions other than the initial position of the second sequence of positions.

7. The method of claim 1, further comprising:
   applying the first transmission parameter to a third block of data, the third block of data being identical to and transmitted immediately following the first block of data;
   applying the second transmission parameter to a fourth block of data, the fourth block of data being identical to and transmitted immediately following the second block of data;
   wherein the transmitted information comprises the first block of data, the second block of data, the third block of data, and the fourth block of data.

8. The method of claim 7, wherein the receiving device is configured to generate an estimate regarding bits contained in the first block of data and to update that estimate in response to receiving the third block of data.

9. A method, performed in a receiving device, for receiving additional information from a transmitting device in a wireless communications network, the additional information comprising an ordered sequence of bits, wherein the method comprises:
   receiving information from the transmitting device, the information having been encoded according to an ordered sequence of transmission parameters, the ordered sequence of transmission parameters comprising a plurality of transmission parameters arranged in a sequence of positions, the sequence of positions comprising an initial position, wherein a first transmission parameter of the plurality of transmission parameters is at the initial position in the ordered sequence of transmission parameters and a second transmission parameter of the plurality of transmission parameters is at a second position in the ordered sequence of transmission parameters;
   wherein the received information comprises a first block of data to which the first transmission parameter has been applied and a second block of data to which the second transmission parameter has been applied;
   based on the received information, determining the ordered sequence of transmission parameters;
   based on the determined ordered sequence of transmission parameters, determining the ordered sequence of bits.

10. The method of claim 9, wherein the method further comprises:
    using a hypothesis regarding a used set of transmission parameters for transmitting the additional information, decode the received information to obtain decoded information;
    checking a quality metric of the decoded information;
    determining that the quality metric is satisfactory; and
    based on the determination that the quality metric is satisfactory, determining the additional information from the hypothesis used.

11. A computer program product comprising a non-transitory computer readable medium storing a computer program comprising instructions that when executed by at least one processor cause the at least one processor to carry out the method of claim 10.

12. The method of claim 9, wherein the ordered sequence of bits is mapped to the ordered sequence of transmission parameters.

13. The method of claim 9, wherein the received information comprises blocks of data that are repeated 7 times in a first set of time division multiple access frames of each of 4 consecutive 51-multiframes and a different circular shift has been selected based on the 51-multiframe that was transmitted, whereby the additional information consists of 2 bits that have been transmitted using a determined order of 4 different circular shifts, and the additional information is indicated by how said 4 different circular shifts map to said four consecutive 51-multiframes.

14. The method of claim 9, further comprising:
receiving second information from the transmitting device, the second information having been encoded according to a second ordered sequence of transmission parameters comprising a second plurality of transmission parameters arranged in a second sequence of positions, the second sequence of positions comprising an initial position, the second ordered sequence of transmission parameters indicating second additional information comprising a second ordered sequence of bits;
wherein the second ordered sequence of transmission parameters comprises the first transmission parameter at a position in the second sequence of positions other than the initial position of the second sequence of positions.

15. The method of claim 9, wherein the received information further comprises:
a third block of data to which the first transmission parameter has been applied, the third block of data being identical to and received immediately following the first block of data; and
a fourth block of data to which the second transmission parameter has been applied, the fourth block of data being identical to and received immediately following the second block of data.

16. The method of claim 15, further comprising generating an estimate regarding bits contained in the first block of data; and
in response to receiving the third block of data, updating the estimate;
wherein the step of determining the ordered sequence of transmission parameters is performed by analyzing the updated estimate.

17. A transmitting device for transmitting additional information to a receiving device in a wireless communications network, the transmitting device comprising:
a memory; and
a processing unit comprising a processor;
wherein the transmitting device is configured to:
determine additional information to transmit to the receiving device, the additional information comprising an ordered sequence of bits;
based on the ordered sequence of bits, select an ordered sequence of transmission parameters comprising a plurality of transmission parameters arranged in a sequence of positions, the sequence of positions comprising an initial position, wherein a first transmission parameter of the plurality of transmission parameters is at the initial position in the ordered sequence of transmission parameters and a second transmission parameter of the plurality of transmission parameters is at a second position in the ordered sequence of transmission parameters, the ordered sequence of transmission parameters being selected to indicate the ordered sequence of bits to the receiving device;
apply the first transmission parameter to a first block of data;
apply the second transmission parameter to a second block of data; and
transmit information to the receiving device using the ordered sequence of transmission parameters, wherein the ordered sequence of transmission parameters indicates the additional information to the receiving device.

18. The transmitting device of claim 17, wherein the ordered sequence of bits is mapped to a certain order of transmission parameters, the certain order of transmission parameters being selected as the ordered sequence of transmission parameters.

19. The transmitting device of claim 17, wherein the ordered sequence of transmission parameters comprises an ordered sequence of different circular shifts.

20. The transmitting device of claim 17, wherein the transmitted information comprises blocks of data that are repeated 7 times in a first set of time division multiple access frames of each of 4 consecutive 51-multiframes, and a different circular shift is selected based on the 51-multiframe that is being transmitted, whereby the additional information consists of 2 bits that are being transmitted using a determined order of 4 different circular shifts, and the additional information is indicated by how said 4 different circular shifts map to said four consecutive 51-multiframes.

21. The transmitting device of claim 17, the transmitting device being further configured to:
transmit second information to the receiving device using a second ordered sequence of transmission parameters comprising a second plurality of transmission parameters arranged in a second sequence of positions, the second sequence of positions comprising an initial position, the second ordered sequence of transmission parameters indicating second additional information comprising a second ordered sequence of bits;
wherein the second ordered sequence of transmission parameters comprises the first transmission parameter at a position in the second sequence of positions other than the initial position of the second sequence of positions.

22. The transmitting device of claim 17, the transmitting device being further configured to:
apply the first transmission parameter to a third block of data, the third block of data being identical to and transmitted immediately following the first block of data;
apply the second transmission parameter to a fourth block of data, the fourth block of data being identical to and transmitted immediately following the second block of data;
wherein the transmitted information comprises the first block of data, the second block of data, the third block of data, and the fourth block of data.

23. A receiving device for receiving additional information from a transmitting device in a wireless communications network, the receiving device comprising:
a memory; and
a processing unit comprising a processor;
wherein the receiving device is configured to:
receive information from the transmitting device, the information having been encoded according to an ordered sequence of transmission parameters, the ordered sequence of transmission parameters comprising a plurality of transmission parameters arranged in a sequence of positions, the sequence of positions comprising an initial position, wherein a first transmission parameter of the plurality of transmission parameters is at the initial position in the ordered sequence of transmission parameters and a second transmission parameter of the plurality of transmission parameters is at a second position in the ordered sequence of transmission parameters;

wherein the received information comprises a first block of data to which the first transmission parameter has been applied and a second block of data to which the second transmission parameter has been applied;

based on the received information, determine the ordered sequence of transmission parameters;

based on the determined ordered sequence of transmission parameters, determine the ordered sequence of bits.

24. The receiving device of claim 23, wherein the receiving device is further configured to:

using a hypothesis regarding a used set of transmission parameters for transmitting the additional information, decode the received information to obtain decoded information check a quality metric of the decoded information;

determine that the quality metric is satisfactory; and based on the determination that the quality metric is satisfactory, determine the additional information from the hypothesis used.

25. The receiving device of claim 23, wherein the ordered sequence of bits is mapped to the ordered sequence of transmission parameters.

26. The receiving device of claim 23, wherein the received information comprises blocks of data that are repeated 7 times in a first set of time division multiple access frames of each of 4 consecutive 51-multiframes and a different circular shift has been selected based on the 51-multiframe that was transmitted, whereby the additional information consists of 2 bits that have been transmitted using a determined order of 4 different circular shifts, and the additional information is indicated by how said 4 different circular shifts map to said four consecutive 51-multiframes.

27. The receiving device of claim 23, the receiving device being further configured to:

receive second information from the transmitting device, the second information having been encoded according to a second ordered sequence of transmission parameters comprising a second plurality of transmission parameters arranged in a second sequence of positions, the second sequence of positions comprising an initial position, the second ordered sequence of transmission parameters indicating second additional information comprising a second ordered sequence of bits;

wherein the second ordered sequence of transmission parameters comprises the first transmission parameter at a position in the second sequence of positions other than the initial position of the second sequence of positions.

28. The receiving device of claim 23, wherein the received information further comprises:

a third block of data to which the first transmission parameter has been applied, the third block of data being identical to and received immediately following the first block of data; and a fourth block of data to which the second transmission parameter has been applied, the fourth block of data being identical to and received immediately following the second block of data.

29. The receiving device of claim 28, the receiving device being further configured to:

generate an estimate regarding bits contained in the first block of data; and in response to receiving the third block of data, update the estimate;

wherein the step of determining the ordered sequence of transmission parameters is performed by analyzing the updated estimate.

* * * * *